United States Patent
Wu

(10) Patent No.: US 8,081,161 B2
(45) Date of Patent: Dec. 20, 2011

(54) SLENDER WHEEL MOUSE

(75) Inventor: Chun-Che Wu, Taipei (TW)

(73) Assignee: Primax Electronics Ltd., Taipei (TW)

( * ) Notice: Subject to any disclaimer, the term of this patent is extended or adjusted under 35 U.S.C. 154(b) by 474 days.

(21) Appl. No.: 12/357,071

(22) Filed: Jan. 21, 2009

(65) Prior Publication Data

US 2010/0141582 A1 Jun. 10, 2010

(30) Foreign Application Priority Data

Dec. 5, 2008 (TW) .............................. 97147384 A

(51) Int. Cl.
*G06F 3/033* (2006.01)
(52) U.S. Cl. ......... 345/163; 345/156; 345/166; 345/157
(58) Field of Classification Search ........... 345/163–184
See application file for complete search history.

(56) References Cited

U.S. PATENT DOCUMENTS

| | | | | |
|---|---|---|---|---|
| 5,912,661 | A * | 6/1999 | Siddiqui | 345/166 |
| 6,348,913 | B1 * | 2/2002 | Cho | 345/163 |
| 6,987,505 | B1 * | 1/2006 | Koo | 345/163 |
| 7,079,110 | B2 * | 7/2006 | Ledbetter et al. | 345/156 |
| 7,170,493 | B2 * | 1/2007 | Lu | 345/163 |
| 7,283,124 | B2 * | 10/2007 | Pai | 345/167 |
| 7,324,090 | B2 * | 1/2008 | Koo | 345/163 |
| 7,379,050 | B2 * | 5/2008 | Chou et al. | 345/163 |
| 7,963,233 | B2 * | 6/2011 | Wu | 108/43 |
| 2002/0060663 | A1 * | 5/2002 | Wang | 345/156 |
| 2002/0140665 | A1 * | 10/2002 | Gordon | 345/156 |
| 2007/0195072 | A1 * | 8/2007 | Yeh et al. | 345/184 |
| 2007/0273652 | A1 * | 11/2007 | Yen | 345/163 |

* cited by examiner

*Primary Examiner* — Van Chow
(74) *Attorney, Agent, or Firm* — Kirton & McConkie; Evan R. Witt

(57) ABSTRACT

A slender wheel mouse includes a mouse case, a base, a circuit board, a supporting member, a tilt frame, a slender wheel, an encoder, a slender ratchet, a resilience sheet and several switch elements. The slender ratchet is engaged with the slender wheel to drive the encoder. The slender wheel has a relatively smaller diameter and thus the height of the mouse case is reduced.

12 Claims, 4 Drawing Sheets

SLENDER WHEEL MOUSE

FIELD OF THE INVENTION

The present invention relates to a wheel mouse, and more particularly to a wheel mouse having a slender wheel.

BACKGROUND OF THE INVENTION

With rapid development of electronic and information industries, computers and the peripheral device thereof become essential parts in our daily lives. For example, mice are important peripheral devices of computers for establishing contact between the personal computers and the users. For helping the user well operate the computer, many novel mice with expanded functions are developed in views of humanization and user-friendliness.

For facilitating the user to browse web pages or documents containing a great amount of data, a wheel mouse having an additional wheel has been developed to perform a vertical scrolling function. By rotating the wheel of the wheel mouse forwardly or backwardly, the graphic-based window or the web page shown on the computer screen may be scrolled in the vertical direction. FIG. 1 is a schematic side view of a conventional wheel mouse. As shown in FIG. 1, the conventional wheel mouse 1 principally comprises a mouse case 10, a wheel 11 and an encoder 12. A portion of the wheel 11 is protruded out of the mouse case 10 such that the wheel 11 can be rotated by a user's finger. In addition, the wheel 11 is sheathed around the rotating shaft 13. An end of the rotating shaft 13 is inserted into the encoder 12. Upon rotation of the wheel 11, the encoder 12 generates an electronic signal. In response to the electronic signal, a vertical scrolling function of the wheel mouse 1 is executed, and thus the graphic-based window or the web page shown on the computer screen is scrolled in the vertical direction.

Recently, the trend of designing a mouse is toward a slim type mouse in order to enhance its portability. For reducing the thickness of the wheel mouse, the height of the mouse case 10 needs to be as small as possible. For reducing the height of the mouse case 10, the heights or the volumes of individual components within the mouse case 10 needs to be reduced. Among the internal components of the mouse case 10, the wheel 11 and the encoder 12 are relatively higher. For reducing the height of the mouse case 10, there are two important issues required to be taken into consideration. Firstly, the wheel 11 needs to be partially protruded out of the mouse case 10. Secondly, the rotating shaft 13 needs to be inserted into the encoder 12. In a case that the location of the wheel 11 is lowered or the diameter of the wheel 11 is reduced, the wheel 11 is usually exposed outside of the mouse case 10 or the rotating shaft 13 is difficult to be inserted into the encoder 12. Under this circumstance, the function of the wheel 11 fails to be successfully executed. In another case that the volume of the encoder 12 is reduced or the location of the encoder 12 is lowered, the location of the wheel 11 may be slightly lowered. Since the wheel 11 needs to be partially protruded out of the mouse case 10 and the rotating shaft 13 needs to be inserted into the encoder 12, the diameter of the wheel 11 cannot be reduced. In other words, the extent of reducing the height of the mouse case 10 according to the prior art is still not satisfied.

Recently, wider computer screens are gradually adopted. For scrolling the graphic-based window or the web page shown on the computer screen in the horizontal direction, a so-called tilt wheel mouse has been developed to perform the horizontal scrolling function. Therefore, there is a need of providing a wheel mouse having the functions of a slim wheel mouse and a tilt wheel mouse.

SUMMARY OF THE INVENTION

It is an object of the present invention to provide a slender wheel mouse having the functions of a slim wheel mouse and a tilt wheel mouse.

In accordance with an aspect of the present invention, there is provides a slender wheel mouse. The slender wheel mouse includes a base, a circuit board, a supporting member, a tilt frame, a slender wheel, an encoder, a slender ratchet and a resilience sheet. The circuit board is disposed on the base. The supporting member is disposed on the base and movable upwardly or downwardly with respect to the base. The tilt frame is disposed on the supporting member and tiltable with respect to the supporting member. The slender wheel is disposed on the tilt frame and has multiple saw-toothed structures formed on a surface thereof. The encoder is disposed on the circuit board and beside the supporting member. The slender ratchet has multiple ratchet pawls, wherein a first end of the slender ratchet is inserted into the encoder. The resilience sheet is disposed on the supporting member. The resilience sheet is sustained against the slender ratchet such that the ratchet pawls are engaged with the saw-toothed structures and the slender ratchet is rotated with the slender wheel.

In an embodiment, the base further includes a first fixing plate, a second fixing plate and a third fixing plate, which are penetrated through corresponding perforations of the circuit board and connected with the supporting member. The first fixing plate has a first fixing plate gliding groove, the second fixing plate has a second fixing plate aperture, and the third fixing plate has a third fixing plate aperture.

In an embodiment, the supporting member includes a first protrusion, a second protrusion and a third protrusion. The first protrusion is inserted into the first fixing plate gliding groove. The second protrusion is inserted into the second fixing plate aperture. The third protrusion is inserted into the third fixing plate aperture. By using the second protrusion and third protrusion as a shaft and gliding the first protrusion along the first fixing plate gliding groove, the supporting member is movable upwardly or downwardly with respect to the base.

In an embodiment, the slender wheel mouse further includes a first switch element, which is arranged on the circuit board and under the first protrusion of the supporting member. When the supporting member is moved downwardly, the first switch element is triggered by the first protrusion, so that the slender wheel mouse executes a wheel button function.

In an embodiment, the base further includes a fourth fixing plate and a fifth fixing plate, which are penetrated through corresponding perforations of the circuit board and connected with the slender ratchet. The fourth fixing plate has a fourth fixing plate gliding groove, and the fifth fixing plate has a fifth fixing plate gliding groove.

In an embodiment, the first end of the slender ratchet is penetrated through the fourth fixing plate gliding groove and inserted into the encoder, and a second end of the slender ratchet is penetrated though the fifth fixing plate gliding groove. The first end and the second end of the slender ratchet are respectively glided along the fourth fixing plate gliding groove and the fifth fixing plate gliding groove when the supporting member is moved upwardly or downwardly with respect to the base.

In an embodiment, the first protrusion, the second protrusion and the third protrusion are integrally formed with the supporting member.

In an embodiment, the first fixing plate, the second fixing plate, the third fixing plate, the fourth fixing plate and the fifth fixing plate are integrally formed with the base.

In an embodiment, the tilt frame includes a ring-shaped receptacle, a first wheel post and a second wheel post. The ring-shaped receptacle is used for accommodating the slender wheel. The first wheel post and the second wheel post are respectively inserted into both ends of the slender wheel. By using the first wheel post and the second wheel post as a shaft, the slender wheel is rotatable within the ring-shaped receptacle.

In an embodiment, the supporting member further includes a first hole and a second hole, and the tilt frame further includes a first tilting frame post and a second tilting frame post respectively inserted into the first hole and the second hole. By using the first tilting frame post and the second tilting frame post as a shaft, the tilt frame is tiltable with respect to the supporting member.

In an embodiment, a first triggering arm and a second triggering arm are protruded from bilateral sides of the tilt frame.

In an embodiment, the slender wheel mouse further includes a second switch element and a third switch element, which are arranged on the circuit board and respectively under the first triggering arm and the second triggering arm. When the tilt frame is tilted with respect to the supporting member, the second switch element is triggered by the first triggering arm or the third switch element is triggered by the second triggering arm, so that the slender wheel mouse executes a tilt wheel function.

In an embodiment, when the slender wheel is rotated in a clockwise direction, the slender ratchet is driven by the slender wheel to be rotated in an anti-clockwise direction.

In an embodiment, when the slender wheel is rotated in an anti-clockwise direction, the slender ratchet is driven by the slender wheel to be rotated in a clockwise direction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

In views of slimness, the wheel mouse of the present invention uses a slender wheel in place of the conventional circular wheel.

Figure 1:
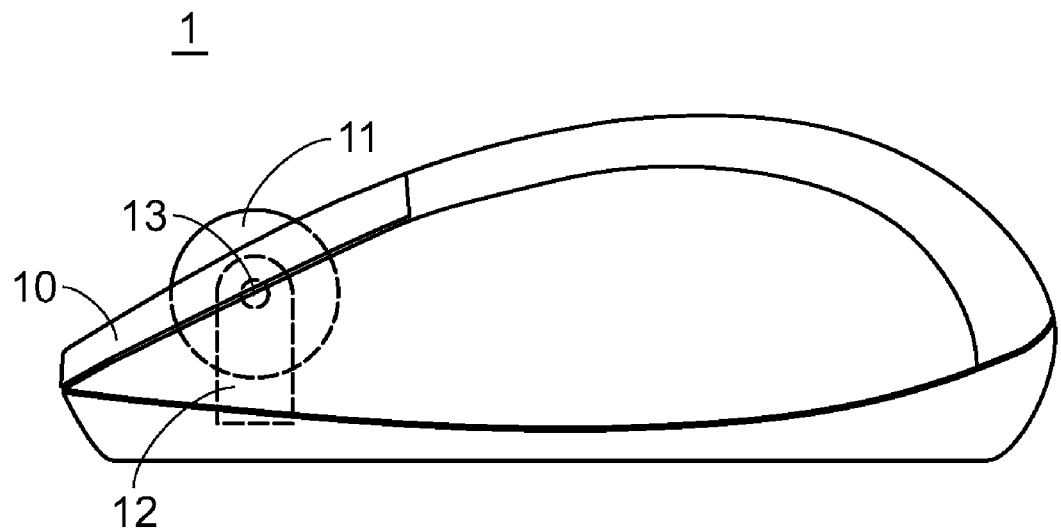
FIG. 1 is a schematic side view of a conventional wheel mouse.
Figure 2:
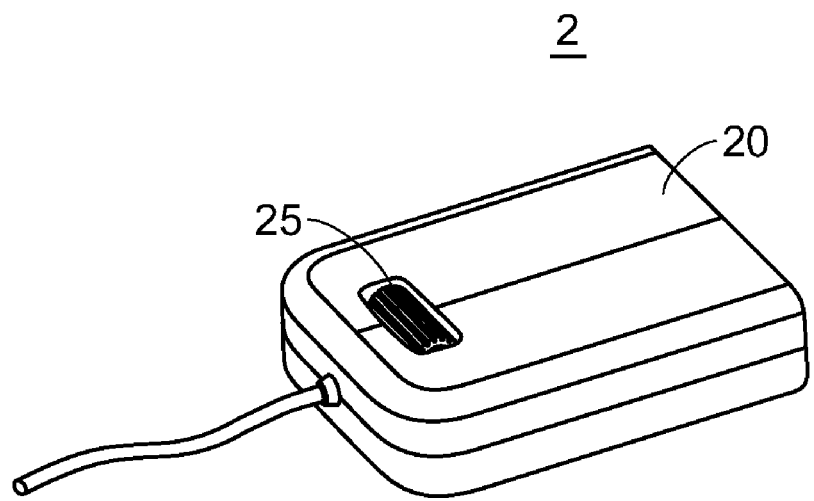
FIG. 2 is a schematic outward view of a slender wheel mouse according to a preferred embodiment of the present invention.

FIG. 2 is a schematic outward view of a slender wheel mouse according to a preferred embodiment of the present invention. The slender wheel mouse 2 principally comprises a mouse case 20 and a slender wheel 25. The mouse case 20 is a slim mouse case.

Figure 3:
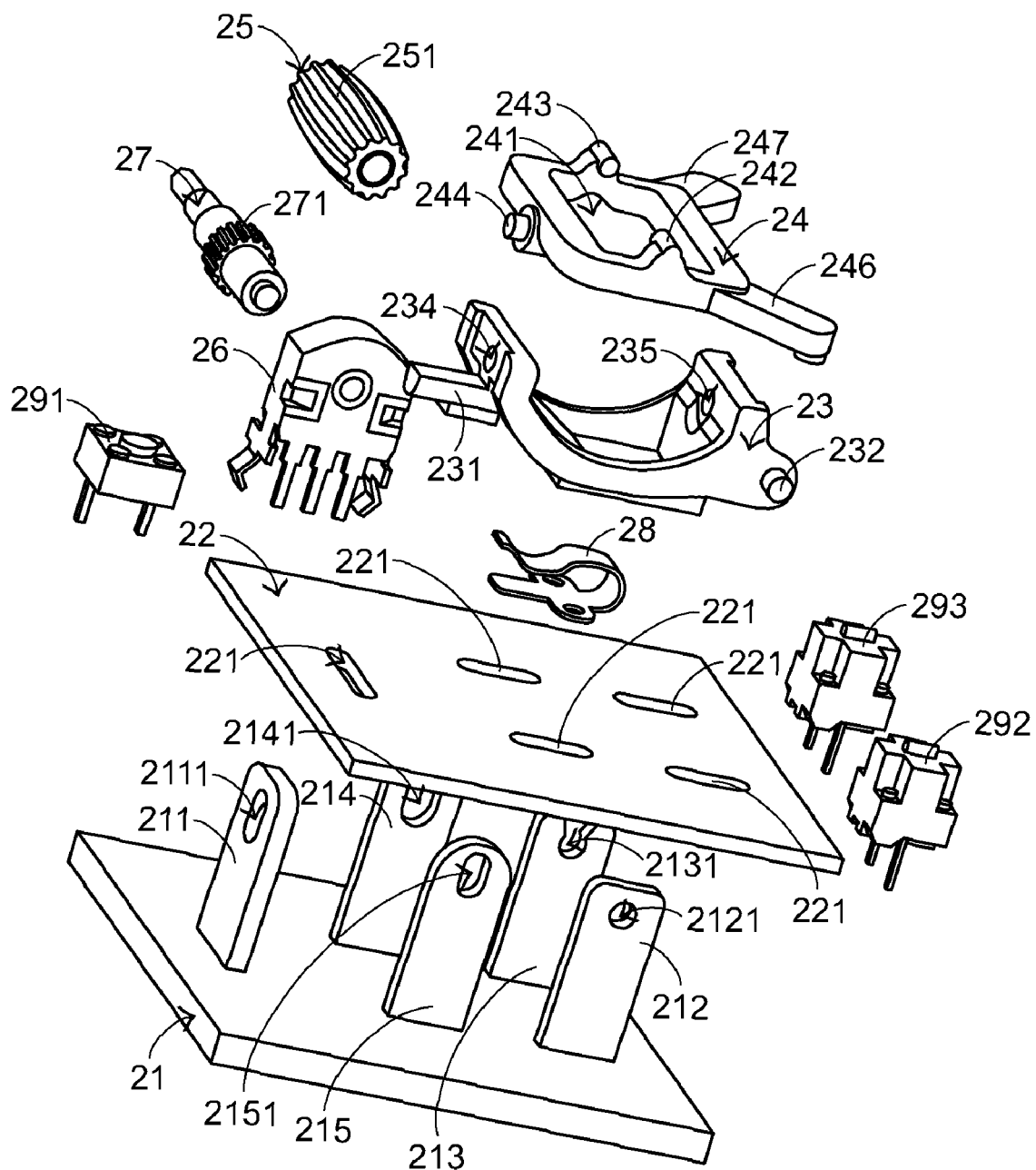
FIG. 3 is a schematic exploded view illustrating the internal portion of the slender wheel mouse according to the preferred embodiment of the present invention.

FIG. 3 is a schematic exploded view illustrating the internal portion of the slender wheel mouse according to the preferred embodiment of the present invention. As shown in FIG. 3, the internal portion of the slender wheel mouse 2 comprises a base 21, a circuit board 22, a supporting member 23, a tilt frame 24, a slender wheel 25, an encoder 26, a slender ratchet 27, a resilience sheet 28, a first switch element 291, a second switch element 292 and a third switch element 293. The base 21 further comprises a first fixing plate 211, a second fixing plate 212, a third fixing plate 213, a fourth fixing plate 214 and a fifth fixing plate 215, which are protruded from a surface of the base 21. The first fixing plate 211 has a first fixing plate gliding groove 2111. The second fixing plate 212 has a second fixing plate aperture 2121. The third fixing plate 213 has a third fixing plate aperture 2131. The fourth fixing plate 214 has a fourth fixing plate gliding groove 2141. The fifth fixing plate 215 has a fifth fixing plate gliding groove 2151. It is preferred that the first fixing plate 211, the second fixing plate 212, the third fixing plate 213, a fourth fixing plate 214 and the fifth fixing plate 215 are integrally formed with the base 21. The circuit board 22 has multiple perforations 221. The supporting member 23 has a first protrusion 231, a second protrusion 232, a third protrusion 233 (as shown in FIG. 3), a first hole 234 and a second hole 235. The tilt frame 24 has a ring-shaped receptacle 241, a first wheel post 242, a second wheel post 243, a first tilting frame post 244, a second tilting frame post 245, a first triggering arm 246 and a second triggering arm 247. In addition, multiple saw-toothed structures 251 are formed on the surface of the slender wheel 25, and the slender ratchet 27 has multiple ratchet pawls 271.

Figure 4:
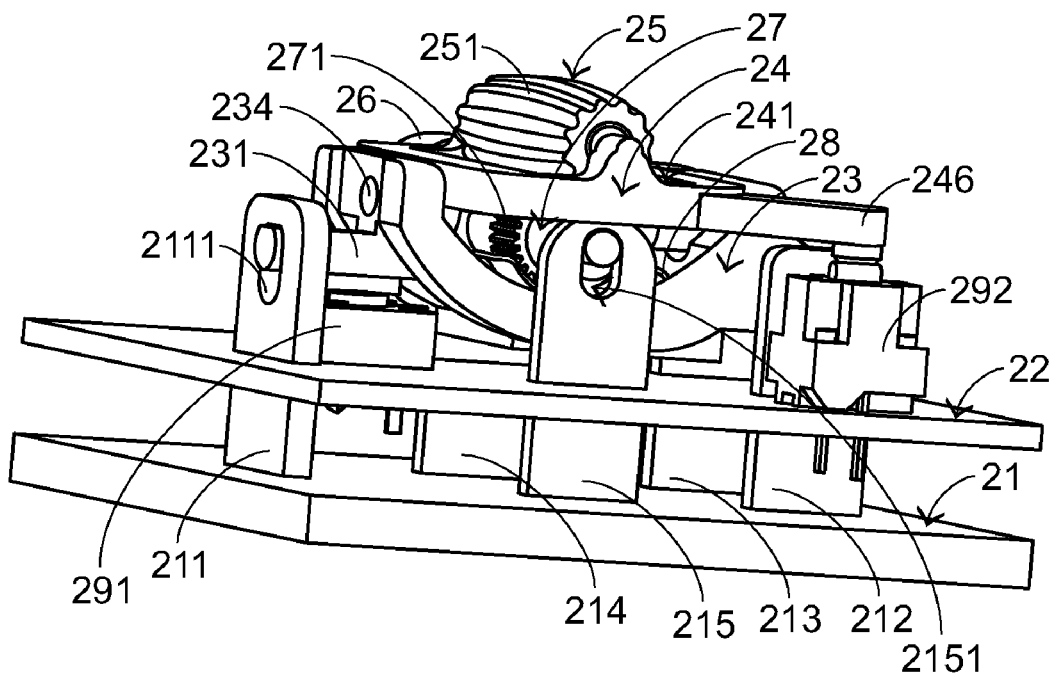
FIG. 4 is a schematic assembled view illustrating the internal portion of the slender wheel mouse according to the preferred embodiment of the present invention.
Figure 6:
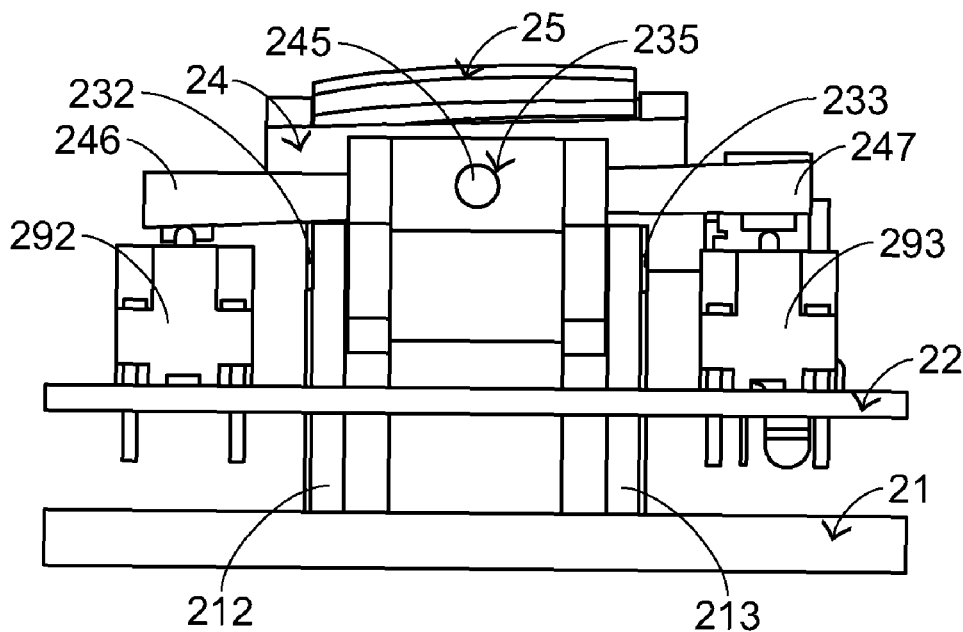
FIG. 6 is a schematic view illustrating the operation of triggering the second switch element by the tilt frame of the slender wheel mouse according to the preferred embodiment of the present invention.

FIG. 4 is a schematic assembled view illustrating the internal portion of the slender wheel mouse according to the preferred embodiment of the present invention. As shown in FIG. 4, the fixing plates 211, 212, 213, 214 and 215 of the base 21 are penetrated through corresponding perforations 221 of the circuit board 22 such that the circuit board 22 is mounted on the base 21. The supporting member 23 is disposed on the base 21. The first protrusion 231 of the supporting member 23 is inserted into the first fixing plate gliding groove 2111. The second protrusion 232 of the supporting member 23 is inserted into the second fixing plate aperture 2121 of the second fixing plate 212 (as shown in FIG. 6). The third protrusion 233 of the supporting member 23 is inserted into the third fixing plate aperture 2131 of the third fixing plate 213 (as shown in FIG. 6). As such, the supporting member 23 is fixed on the first fixing plate 211, the second fixing plate 212 and the third fixing plate 213 of the base 21. The first switch element 291 is arranged on the circuit board 22 and under the first protrusion 231 of the supporting member 23. The second switch element 292 is arranged on a side of the circuit board 22. The third switch element 293 is arranged on another side of the circuit board 22 (as shown in FIG. 6).

The first tilting frame post 244 of the tilt frame 24 is inserted into the first hole 234 of the supporting member 23. The second tilting frame post 245 of the tilt frame 24 is inserted into the second hole 235 of the supporting member 23 (as shown in FIG. 6). The tilt frame 24 is disposed on the supporting member 23. By using the first tilting frame post 244 and the second tilting frame post 245 as a shaft, the tilt frame 24 is tiltable with respect to the supporting member 23. The ring-shaped receptacle 241 of the tilt frame 24 is used for accommodating the slender wheel 25. The first wheel post 242 and the second wheel post 243 of the tilt frame 24 are inserted into both ends of the slender wheel 25. As such, the slender wheel 25 is accommodated in the ring-shaped receptacle 241 of the tilt frame 24 and rotatable with respect to the supporting member 23 by using the first tilting frame post 244 and the second tilting frame post 245 as the shaft. The first triggering arm 246 and the second triggering arm 247 are protruded from bilateral sides of the tilt frame 24 (as shown in FIG. 6).

Figure 5:
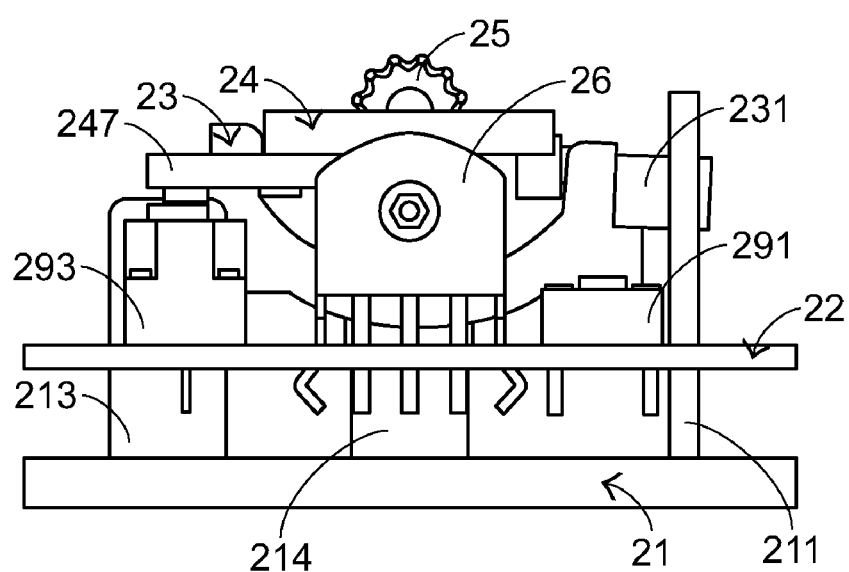
FIG. 5 is a schematic view illustrating the operation of triggering the first switch element by the supporting member of the slender wheel mouse according to the preferred embodiment of the present invention.

The encoder 26 is mounted on the circuit board 23 and beside the supporting member 23. A first end of the slender ratchet 27 is penetrated through the fourth fixing plate gliding groove 2141 and inserted into the encoder 26 (as shown in FIG. 5 and FIG. 6). A second end of the slender ratchet 27 is penetrated though the fifth fixing plate gliding groove 2151. The resilience sheet 28 is disposed on the supporting member 23 and sustained against the slender ratchet 27. Due to the upward elastic force of the resilience sheet 28, the ratchet pawls 271 of the slender ratchet 27 are engaged with the saw-toothed structures 251 of the slender wheel 25. As a consequence, the slender ratchet 27 is rotated with the slender wheel 25. Upon rotation of the slender ratchet 27, the encoder 26 generates an electronic signal. In response to the electronic signal, a vertical scrolling function of the wheel mouse 2 is executed, and thus the graphic-based window or the web page shown on the computer screen is scrolled in the vertical direction. Since the ratchet pawls 271 of the slender ratchet 27 are engaged with the saw-toothed structures 251 of the slender wheel 25, the slender ratchet 27 and the slender wheel 25 are rotated in opposite directions. For example, when the slender wheel 25 is rotated in the clockwise direction by the user, the slender ratchet 27 is driven by the slender wheel 25 to be rotated in the anti-clockwise direction. Whereas, when the slender wheel 25 is rotated in the anti-clockwise direction by the user, the slender ratchet 27 is driven by the slender wheel 25 to be rotated in the clockwise direction.

Recently, the wheel mouse is developed to have expanded functions. For example, the wheel mouse may have a wheel button function. When the wheel is pressed down to trigger a specified switch element, the wheel button function is executed. An exemplary wheel button function is an automatic vertical scrolling function for automatically scrolling the graphic-based window or the web page shown on the computer screen. Hereinafter, the process of triggering the wheel button function by pressing down the slender wheel 25 will be illustrated with reference to FIG. 5. FIG. 5 is a schematic view illustrating the operation of triggering the first switch element by the supporting member of the slender wheel mouse according to the preferred embodiment of the present invention. When the slender wheel 25 is pressed down by the user, the slender wheel 25 is moved downwardly and sustained against the slender ratchet 27 and the resilience sheet 28 and thus the tilt frame 24 is moved downwardly. Since the tilt frame 24 is connected to the supporting member 23, a depressing force is exerted on the supporting member 23 in response to the downward movement of the tilt frame 24. Due to the depressing force, both ends of the slender ratchet 27 are respectively glided along the fourth fixing plate gliding groove 2141 and the fifth fixing plate gliding groove 2151. The second protrusion 232 and the third protrusion 233 of the supporting member 23 are respectively fixed in the second fixing plate aperture 2121 and the third fixing plate aperture 2131. By using the second protrusion 232 and the third protrusion 233 as a shaft and gliding the first protrusion 231 along the first fixing plate gliding groove 2111, the supporting member 23 is movable upwardly or downwardly with respect to the base 21 in response to the depressing force exerted on the supporting member 23. As the supporting member 23 is moved downwardly, the first protrusion 231 is contacted with the first switch element 291 that is under the first protrusion 231 so as to trigger the first switch element 291. When the first switch element 291 is triggered, the first switch element 291 generates a wheel button signal to the circuit board 22. In response to the wheel button signal, the slender wheel mouse 2 executes the wheel button function.

When the depressing force exerted on the slender wheel 25 is eliminated, the slender ratchet 27 is pushed upwardly due to the restoring force of the compressed resilience sheet 28. As such, the slender ratchet 27, the slender wheel 25, the tilt frame 24 and the supporting member 23 are returned to their original positions.

Figure 7:
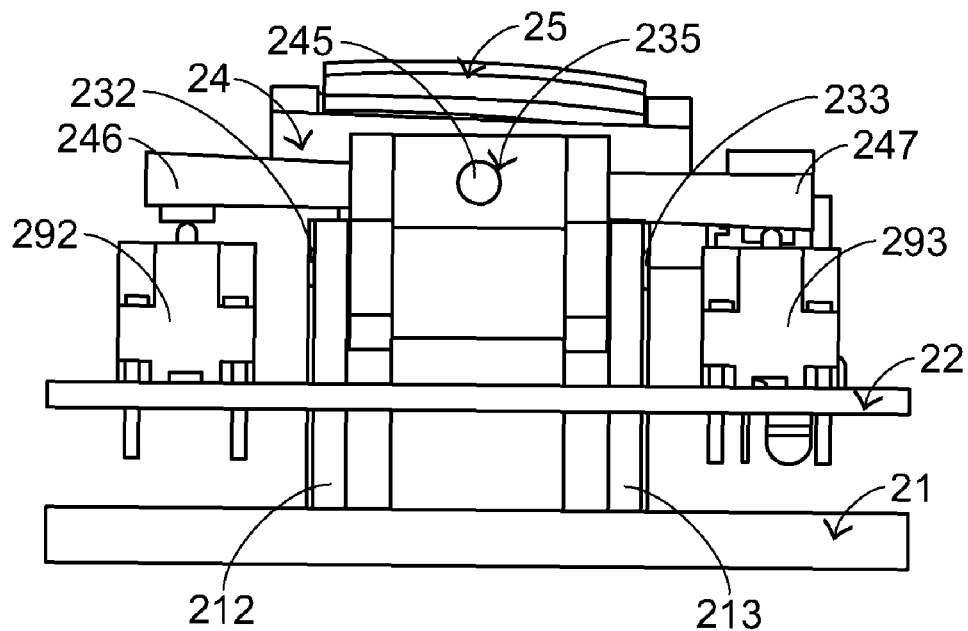
FIG. 7 is a schematic view illustrating the operation of triggering the third switch element by the tilt frame of the slender wheel mouse according to the preferred embodiment of the present invention.

Hereinafter, the processes of triggering the tilt wheel function by the tilting the slender wheel mouse will be illustrated with reference to FIG. 6 and FIG. 7. FIG. 6 is a schematic view illustrating the operation of triggering the second switch element by the tilt frame of the slender wheel mouse according to the preferred embodiment of the present invention. FIG. 7 is a schematic view illustrating the operation of triggering the third switch element by the tilt frame of the slender wheel mouse according to the preferred embodiment of the present invention. In this embodiment, when the tilt wheel function is executed, the graphic-based window or the web page shown on the computer screen is scrolled in the horizontal direction. In a case that the slender wheel 25 is tilted toward the left side by the user, the tilt frame 24 is also tilted toward the left side. That is, the tilt frame 24 is tilted with respect to the supporting member 23 by using the first tilting frame post 244 and the second tilting frame post 245 as a shaft. As the tilt frame 24 is tilted toward the left side, the first triggering arm 246 is contacted with the second switch element 292 that is under the first triggering arm 246 so as to trigger the second switch element 292. When the second switch element 292 is triggered, the second switch element 292 generates a left-tilt signal to the circuit board 22. In response to the left-tilt signal, the slender wheel mouse 2 executes the tilt wheel function such that the graphic-based window or the web page shown on the computer screen is scrolled in the left and horizontal direction. Similarly, in a case that the slender wheel 25 is tilted toward the right side by the user, the tilt frame 24 is also tilted toward the right side to trigger the third switch element 293 that is under the second triggering arm 247. When the third switch element 293 is triggered, the third switch element 293 generates a right-tilt signal to the circuit board 22. In response to the right-tilt signal, the slender wheel mouse 2 executes the tilt wheel function such that the graphic-based window or the web page shown on the computer screen is scrolled in the right and horizontal direction.

From the above description, the slender wheel mouse has a slender ratchet and a slender wheel. Since the slender ratchet is connected to the encoder and the slender ratchet is engaged with the slender wheel to drive the encoder, the height of the mouse case is lowly dependent on the height of the encoder. In addition, the slender wheel has a smaller diameter in comparison with the conventional circular wheel. As such, the height of the mouse case is reduced and the wheel mouse of the present invention is slim. Moreover, due to cooperation of the tilt frame and the supporting member, the slender wheel mouse can execute the tilt wheel function and the wheel button function. Since the tilt frame and the supporting member are individual components, when the tilt frame is tilted to execute the tilt wheel function, the supporting member is not moved upwardly or downwardly to trigger the first switch element. Under this circumstance, the erroneous operation of simultaneously triggering two switch elements is avoided. That is, the slender wheel mouse of the present invention has the functions of a slim wheel mouse and a tilt wheel mouse while preventing from the erroneous operation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A slender wheel mouse comprising:
a base;
a circuit board disposed on said base;
a supporting member disposed on said base and movable upwardly or downwardly with respect to said base, wherein said supporting member comprises:
a first protrusion inserted into said first fixing plate gliding groove;
a second protrusion inserted into said second fixing plate aperture; and
a third protrusion inserted into said third fixing plate aperture,
wherein said supporting member is movable upwardly or downwardly with respect to said base by using said second protrusion and third protrusion as a shaft and gliding said first protrusion along said first fixing plate gliding groove, and wherein said base further comprises a first fixing plate, a second fixing plate and a third fixing plate, which are penetrated through corresponding perforations of said circuit board and connected with said supporting member, wherein said first fixing plate has a first fixing plate gliding groove, said second fixing plate has a second fixing plate aperture, and said third fixing plate has a third fixing plate aperture;
a tilt frame disposed on said supporting member and tiltable with respect to said supporting member;
a slender wheel disposed on said tilt frame and having multiple saw-toothed structures formed on a surface thereof;
an encoder disposed on said circuit board and beside said supporting member;
a slender ratchet having multiple ratchet pawls, wherein a first end of said slender ratchet is inserted into said encoder; and
a resilience sheet disposed on said supporting member, wherein said resilience sheet is sustained against said slender ratchet such that said ratchet pawls are engaged with said saw-toothed structures and said slender ratchet is rotated with said slender wheel.

2. The slender wheel mouse according to claim 1 further comprising a first switch element, which is arranged on said circuit board and under said first protrusion of said supporting member, wherein when said supporting member is moved downwardly, said first switch element is triggered by said first protrusion, so that said slender wheel mouse executes a wheel button function.

3. The slender wheel mouse according to claim 1 wherein said base further comprises a fourth fixing plate and a fifth fixing plate, which are penetrated through corresponding perforations of said circuit board and connected with said slender ratchet, wherein said fourth fixing plate has a fourth fixing plate gliding groove, and said fifth fixing plate has a fifth fixing plate gliding groove.

4. The slender wheel mouse according to claim 3 wherein said first end of said slender ratchet is penetrated through said fourth fixing plate gliding groove and inserted into the encoder, and a second end of said slender ratchet is penetrated though said fifth fixing plate gliding groove, wherein said first end and said second end of said slender ratchet are respectively glided along said fourth fixing plate gliding groove and said fifth fixing plate gliding groove when said supporting member is moved upwardly or downwardly with respect to said base.

5. The slender wheel mouse according to claim 1 wherein said first protrusion, said second protrusion and said third protrusion are integrally formed with said supporting member.

6. The slender wheel mouse according to claim 3 wherein said first fixing plate, said second fixing plate, said third fixing plate, said fourth fixing plate and said fifth fixing plate are integrally formed with said base.

7. The slender wheel mouse according to claim 1 wherein a first triggering arm and a second triggering arm are protruded from bilateral sides of said tilt frame.

8. The slender wheel mouse according to claim 7 further comprising a second switch element and a third switch element, which are arranged on said circuit board and respectively under said first triggering arm and said second triggering arm, wherein when said tilt frame is tilted with respect to said supporting member, said second switch element is triggered by said first triggering arm or said third switch element is triggered by said second triggering arm, so that said slender wheel mouse executes a tilt wheel function.

9. The slender wheel mouse according to claim 1 wherein when said slender wheel is rotated in a clockwise direction, said slender ratchet is driven by said slender wheel to be rotated in an anti-clockwise direction.

10. The slender wheel mouse according to claim 1 wherein when said slender wheel is rotated in an anti-clockwise direction, said slender ratchet is driven by said slender wheel to be rotated in a clockwise direction.

11. A slender wheel mouse comprising:
a base;
a circuit board disposed on said base;
a supporting member disposed on said base and movable upwardly or downwardly with respect to said base;
a tilt frame disposed on said supporting member and tiltable with respect to said supporting member;
a slender wheel disposed on said tilt frame and having multiple saw-toothed structures formed on a surface thereof;
an encoder disposed on said circuit board and beside said supporting member;
a slender ratchet having multiple ratchet pawls, wherein a first end of said slender ratchet is inserted into said encoder; and
a resilience sheet disposed on said supporting member, wherein said resilience sheet is sustained against said slender ratchet such that said ratchet pawls are engaged with said saw-toothed structures and said slender ratchet is rotated with said slender wheel, wherein said tilt frame comprises:

a ring-shaped receptacle for accommodating the slender wheel;

a first wheel post and a second wheel post respectively inserted into both ends of said slender wheel, wherein said slender wheel is rotatable within said ring-shaped receptacle by using said first wheel post and said second wheel post as a shaft.

12. A slender wheel mouse comprising:

a base;

a circuit board disposed on said base;

a supporting member disposed on said base and movable upwardly or downwardly with respect to said base;

a tilt frame disposed on said supporting member and tiltable with respect to said supporting member;

a slender wheel disposed on said tilt frame and having multiple saw-toothed structures formed on a surface thereof;

an encoder disposed on said circuit board and beside said supporting member;

a slender ratchet having multiple ratchet pawls, wherein a first end of said slender ratchet is inserted into said encoder; and a resilience sheet disposed on said supporting member, wherein said resilience sheet is sustained against said slender ratchet such that said ratchet pawls are engaged with said saw-toothed structures and said slender ratchet is rotated with said slender wheel, wherein said supporting member further comprises a first hole and a second hole, and said tilt frame further comprises a first tilting frame post and a second tilting frame post respectively inserted into said first hole and said second hole, wherein said tilt frame is tiltable with respect to said supporting member by using said first tilting frame post and said second tilting frame post as a shaft.

* * * * *